United States Patent
Izumi et al.

(10) Patent No.: US 10,505,238 B2
(45) Date of Patent: Dec. 10, 2019

(54) COOLING SYSTEM FOR ON-VEHICLE SECONDARY BATTERY

(71) Applicant: TOYOTA JIDOSHA KABUSHIKI KAISHA, Toyota-shi, Aichi-ken (JP)

(72) Inventors: Junta Izumi, Nagoya (JP); Noritaka Ikejiri, Toyota (JP); Kiyoe Ochiai, Nagoya (JP); Kiyohito Machida, Nissin (JP); Masakazu Habu, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 34 days.

(21) Appl. No.: 15/092,166

(22) Filed: Apr. 6, 2016

(65) Prior Publication Data
US 2016/0301115 A1 Oct. 13, 2016

(30) Foreign Application Priority Data

Apr. 10, 2015 (JP) .................. 2015-080905

(51) Int. Cl.
| | |
|---|---|
| *H01M 10/613* | (2014.01) |
| *H01M 10/625* | (2014.01) |
| *B60H 1/00* | (2006.01) |
| *H01M 10/48* | (2006.01) |
| *H01M 10/0525* | (2010.01) |

(Continued)

(52) U.S. Cl.
CPC ...... *H01M 10/625* (2015.04); *B60H 1/00278* (2013.01); *H01M 10/486* (2013.01); *H01M 10/613* (2015.04); *H01M 10/0525* (2013.01);
*H01M 10/6563* (2015.04); *H01M 10/663* (2015.04); *Y02E 60/122* (2013.01)

(58) Field of Classification Search
CPC ................... B60H 1/00278; B60H 11/1874
See application file for complete search history.

(56) References Cited

U.S. PATENT DOCUMENTS

| | | |
|---|---|---|
| 5,937,664 A | 8/1999 | Matsuno et al. |
| 2010/0089669 A1* | 4/2010 | Taguchi ............. B60H 1/00257 180/65.1 |

(Continued)

FOREIGN PATENT DOCUMENTS

| | | | |
|---|---|---|---|
| CN | 102892991 A | 1/2013 | |
| JP | 2010-158964 A | 7/2010 | |
| JP | WO2014/058021 | * 4/2014 | ............. B60L 11/18 |

*Primary Examiner* — Keith M Raymond
*Assistant Examiner* — Nael N Babaa
(74) *Attorney, Agent, or Firm* — Sughrue Mion, PLLC

(57) ABSTRACT

A cooling system includes a cooling fan that blows cooled air to a main battery and a temperature sensor. When the temperature of the main battery is equal to or higher than a first predetermined temperature after start up of an electric drive vehicle, the cooling fan is driven with a constant command value for a predetermined time period and detection process of abnormal condition is performed for detecting presence or absence of abnormal condition of the cooling fan based on an actual rotation speed of the cooling fan. When the start up of the electric drive vehicle is based on an external charging operation of the secondary battery, driving of the cooling fan with the constant command value is inhibited. This structure ensures sufficient opportunities for detecting presence or absence of abnormal condition of the cooling fan.

4 Claims, 11 Drawing Sheets

(51) Int. Cl.
*H01M 10/663* (2014.01)
*H01M 10/6563* (2014.01)

(56) References Cited

U.S. PATENT DOCUMENTS

2010/0304193 A1* 12/2010 Karlsson ............... B60L 3/0046
                                                        429/50
2013/0030643 A1*  1/2013 Nishizawa ................ F01P 5/14
                                                        701/32.8
2015/0010802 A1*  1/2015 Inoue .................. H01M 10/486
                                                        429/120

* cited by examiner

COOLING SYSTEM FOR ON-VEHICLE SECONDARY BATTERY

PRIORITY INFORMATION

This application claims priority to Japanese Patent Application No. 2015-080905 filed on Apr. 10, 2015, which is incorporated herein by reference in its entirety.

TECHNICAL FIELD

The present invention relates to a cooling system for cooling a secondary battery used for driving a vehicle.

BACKGROUND ART

Electric drive vehicles including hybrid vehicles, electric cars, and other vehicles include a secondary battery (battery) mounted therein for storing electric energy for driving a vehicle. As the temperature of a secondary battery rises with charge and discharge due to an internal resistance of the secondary battery itself, the secondary battery must be cooled. Conventional techniques have therefore suggested providing a cooling fan around the secondary battery to forcibly cool the secondary battery.

JP 2010-158964 A, for example, discloses a cooling apparatus for vehicle electronic equipment, which includes a cooling fan near a secondary battery. JP 2010-158964 A discloses that a duct through which cooled air generated by driving a cooling fan flows bifurcates in the middle into two passages so that the route of the cooled air can be changed in accordance with the temperature of a charging device mounted on the vehicle. This cooling apparatus changes the command duty of the cooling fan in accordance with the temperature of a high-voltage secondary battery or an on-vehicle charging device which is to be cooled. This cooling apparatus further detects presence or absence of failure of the cooling fan, and if failure occurs, outputs failure information to a failure diagnosis function unit, and changes control for the electronic equipment in accordance with the content of the failure.

Detected parameters including the actual rotation speed of the cooling fan, for example, are often used for determining occurrence of abnormal condition of the cooling fan. It is desirable to determine presence or absence of abnormal condition as described above in a stationary state of the cooling fan where driving of the cooling fan is stabilized, because a significant change in the driving state (the rotation speed of a fan, and other parameters) of the cooling fan would cause an error in the detected parameters due to control delay and other defects, which makes it impossible to maintain the accuracy in the determination of presence or absence of failure.

In 2010-158964 A, the command duty is changed in accordance with the temperature of the high-voltage secondary battery or the charging device, which makes it difficult to place the cooling fan in a stationary state and therefore to accurately determine presence or absence of abnormal condition of the cooling fan. One possible solution to this problem would be to drive the cooling fan at a constant duty (constant rotation speed) without changing a command duty (command rotation speed) of the cooling fan. In this case, as the driving state of the cooling fan is stabilized, it is possible to accurately determine presence or absence of abnormal condition. However, continuous driving at a constant duty (constant rotation speed) irrespective of the state of the secondary battery and the driving state makes the rotation speed insufficient, causing insufficient cooling of the secondary battery and deterioration of the secondary battery, or conversely, increases the rotation speed to an unnecessarily high level, leading to undesirable noise and power consumption.

SUMMARY

A cooling system for an on-vehicle secondary battery according to an aspect of the invention cools a secondary battery mounted in an electric drive vehicle for driving the vehicle, and includes a cooling fan configured to blow cooled air to the secondary battery, and a temperature sensor configured to detect a temperature of the secondary battery. In the cooling system, when the temperature of the secondary battery is equal to or higher than a first predetermined temperature after start up of the electric drive vehicle, the cooling fan is driven with a constant command value for a predetermined time period, and detection process of abnormal condition is also performed for detecting presence or absence of abnormal condition of the cooling fan based on an actual rotation speed of the cooling fan at this time. Here, driving of the cooling fan with the constant command value is inhibited when the start up of the electric drive vehicle is caused by an external charging operation of the secondary battery. Preferably, the external charging operation may be an operation for connecting a connector of an external power source to a charging connector disposed on the electric drive vehicle.

Although driving of the cooling fan at a constant command value when the temperature of the secondary battery reaches the first predetermined temperature after start up of the electric drive vehicle reduces deterioration of the battery and unnecessary consumption of SOC vehicle while ensuring opportunities for detection of abnormal condition of the cooling fan, the detection of abnormal condition of the cooling fan is similarly performed when the electric drive vehicle is started by an external charging operation, causing prolongation of the charge period. As an embodiment of the invention is configured to inhibit driving of the cooling fan at a constant command value when the vehicle has been started by an external charging operation, it is possible to reduce the power consumption of the secondary battery during charge to thereby prevent prolongation of the charge period of the secondary battery.

Preferably, in the cooling system for on-vehicle secondary battery, the driving of the cooling fan with the constant command value may be inhibited when the temperature of the secondary battery is equal to or higher than a second predetermined temperature which is higher than the first predetermined temperature.

With the above configuration, when the temperature of the secondary battery is low at the start of the electric drive vehicle, opportunities for the detection process of abnormal condition of the cooling fan is secured, whereas if the temperature of the secondary battery is high at the start up of the electric drive vehicle, higher priority is given to cooling of the secondary battery than to attainment of the opportunities for the detection process of abnormal condition of the cooling fan to thereby prevent deterioration of the secondary battery. It is therefore possible to cool the secondary battery appropriately while maintaining opportunities for detecting presence or absence of abnormal condition of the cooling fan.

Preferably, in the cooling system for on-vehicle secondary battery, the constant command value may be set to a value which is lower than a command value corresponding to the temperature of the secondary battery detected when control is performed in which the command value is variable in accordance with the temperature of the secondary battery.

This configuration can prevent a user from feeling uncomfortable by the noise of the cooling fan and also can reduce the power consumption of the secondary battery during charge.

Preferably, in the cooling system for on-vehicle secondary battery, when the temperature of the secondary battery is higher than a third predetermined temperature which is equal to or higher than the first predetermined temperature and lower than the second predetermined temperature, the constant command value may be set to a value which is higher than a command value corresponding to the temperature of the secondary battery detected when control is performed in which the command value is variable in accordance with the temperature of the secondary battery.

This configuration enables effective cooling of the secondary battery to thereby prevent deterioration of the secondary battery when the temperature of the secondary battery at the start of the electric drive vehicle is in a high temperature region within the range of temperatures in which the detection process of abnormal condition of the cooling fan is not inhibited.

Advantageous Effects of the Invention

The present disclosure reduces power consumption of the secondary battery during charge to prevent prolongation of the charge time while maintaining sufficient opportunities for detecting presence or absence of abnormal condition of the cooling fan.

BRIEF DESCRIPTION OF THE DRAWINGS

Preferred embodiments of the invention will be described in detail with reference to the following figures, wherein.

DESCRIPTION OF EMBODIMENTS

Figure 1:
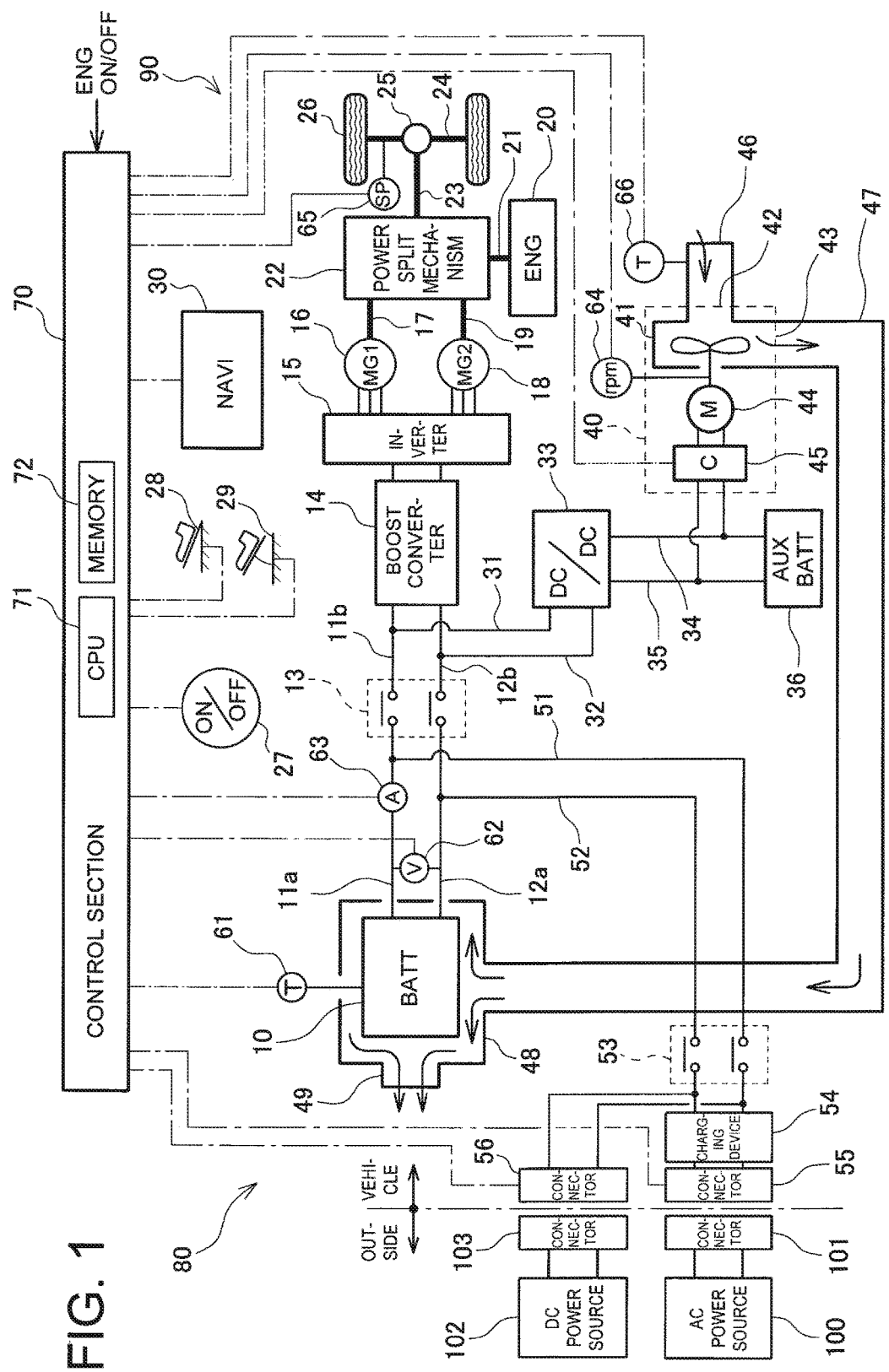
FIG. 1 is a system diagram illustrating a structure of a cooling system for an on-vehicle secondary battery according to an embodiment of the present invention.

Preferred embodiments of the invention will be described in detail with reference to the accompanying drawings.
System Structure of Electric Drive Vehicle Preferred embodiments of the present invention will be described with reference to the drawings. A system structure of an electric drive vehicle 90 on which a cooling system 80 for an on-vehicle secondary battery is mounted will be first described. In FIG. 1, dashed and single-dotted lines denote signal lines. A main battery 10 for driving the vehicle is connected to each of positive-side and negative-side input terminals of a system main relay 13 through a positive-side bus bar 11a and a negative-side bus bar 12a. The main battery 10 is a chargeable/dischargeable secondary battery such as a nickel metal hydride battery or a lithium ion battery. A positive-side output terminal and a negative-side output terminal of the system main relay 13 are connected to a boost converter 14 through a positive side bus bar 11b and a negative-side bus bar 12b, respectively. A positive-side output terminal and a negative-side output terminal of the boost converter 14 are connected to a positive-side input terminal and a negative-side input terminal of an inverter 15, respectively. Three output bus bars of U phase, V phase, and W phase are connected to the inverter, and each output bus bar is connected to an input terminal of each phase of the first and second motor generators 16 and 18. Output shafts 17 and 19 of the motor generators 16 and 18 are connected to a power split mechanism 22 employing a planetary gear train. An output shaft 21 of an engine 20 is also connected to the power split mechanism 22. An output shaft 23 of the power split mechanism 22 drives wheels 26 via a gear mechanism 25 and a vehicle axle 24. The vehicle axle 24 includes a vehicle speed sensor 65 attached thereto for detecting the vehicle speed from the rotation speed.

The positive-side bus bar 11a and the negative-side bus bar 12a connected to the main battery 10 branch into a positive-side bus bar 51 and a negative-side bus bar 52, respectively. The bus bars 51 and 52 are connected, via a charging relay 53, to a charging device 54 which converts electric power from an external AC power source into charging power for charging the main battery 10. A connector 55 (inlet) is connected to the charging device 54. The connector 55 can be connected to a connector 101 (an AC charging plug) of an AC power source 100 (e.g. commercial power source). Connection of the connector 101 to the connector 55 allows the AC power source 100 to charge the main battery 10. A connector 56 to which a connector 103 of an external DC power source 102 can be connected is connected, via the charging relay 53, to the positive-side and negative-side bus bars 51 and 52, so that the battery 10 can also be charged by the external DC power source 102.

A DC/DC converter 33 is connected via positive-side and negative-side bus bars 31 and 32 to the positive-side and negative-side bus bars 11b and 12b, respectively, to which the positive-side output terminal and the negative-side output terminal of the system main relay 13 are respectively connected. The main battery 10 is connected to the system main relay 13. Outputs of the DC/DC converter 33 are connected via positive-side and negative-side low voltage bus bars 34 and 35, respectively, to an auxiliary battery 36. The DC/DC converter 33 decreases the voltage of the main battery 10 to an auxiliary voltage, such as 12V and 24V, for charging the auxiliary battery 36. A cooling fan 40 is connected to the low voltage bus bars 34 and 35. The cooling fan 40 is composed of a fan body 41 which houses an impeller, a motor 44 for driving the impeller, and a control unit 45 for controlling the speed of the motor 44. The control unit 45 is connected to the low voltage bus bars 34 and 35. A suction duct 46 for drawing cooled air is connected to an inlet port 42 of the fan body 41, and a connection duct 47 for supplying cooled air to a casing 48 that houses the main battery 10 is connected to an outlet port 43 of the fan body 41. An exhaust duct 49 for discharging the air after cooling the main battery 10 is mounted on the casing 48. While in the example structure described above, the main battery 10 is cooled by air discharged through the cooling fan 40, the invention is not limited to this structure, and may be configured such that the cooling fan 40 is disposed toward the exhaust duct 49 and is driven to generate a negative voltage in the casing 48 to thereby blow cooled air to the main battery 10. In the present embodiment, the motor 44 which drives the cooling fan 40 may be either a direct-current motor or an alternating-current motor.

An ignition switch 27 which outputs a signal for starting or stopping the electric drive vehicle 90, an accelerator 28, and a brake 29 are further mounted within an interior of the electric drive vehicle 90. A navigation system 30 which detects the current position of the electric drive vehicle 90 or performs route guide to a destination is also provided within the vehicle interior.

A temperature sensor 61 for detecting the temperature of the main battery 10 is mounted on the main battery 10. A voltage sensor 62 for detecting the voltage of the main battery 10 is further connected between the positive-side bus bar 11a and the negative-side bus bar 12a connected to the main battery 10. A current sensor 63 for detecting the charging and discharging current IB of the main battery 10 is further mounted on the positive-side bus bar 11a between the main battery 10 and the system main relay 13. A rotation speed sensor 64 for detecting the rotation speed of the motor 44 is mounted on the cooling fan 40, and a temperature sensor 66 for detecting the temperature of the suction air is mounted on the suction duct 46.

As illustrated in FIG. 1, the control unit 45 of the cooling fan 40 is connected to a control section 70, so that the cooling fan 40 is driven by commands from the control section 70. The ignition switch 27, the temperature sensors 61 and 66, the voltage sensor 62, the current sensor 63, the rotation speed sensor 64, and the vehicle speed sensor 65 are also connected to the control section 70, and an ON operation signal and an OFF operation signal of the ignition switch 27, and detection signals of the sensors 61 to 66 are input to the control section 70. Signals indicating opening of the accelerator 28, a depression amount of the brake 29, and signals indicating whether the connectors 55 and 56 are in a connected state or a disconnected state are also input to the control section 70. The control section 70 is a computer containing a CPU 71 which performs operation processing and signal processing, and a memory 72 which stores control data and maps, programs, and other data for control. The control section 70 also receives an ON/OFF signal indicating whether or not the engine 20 is operating input from another controller.

Basic Operation of Electric Drive Vehicle

The basic operation of the electric drive vehicle 90 configured as described above will be briefly described. When the ignition switch 27 is operated ON to start the ECU and place the electric drive vehicle in an "Ready-ON state," which will be described below, the system main relay 13 turns on, so that direct-current electric power of the main battery 10 is supplied via the boost converter 14 from the inverter 15 to each of the motor generators 16 and 18. The "Ready-ON state" of the electric drive vehicle 90 refers to a state in which the electric drive vehicle 90 is started and the ECU of the electric drive vehicle 90 is actuated. In the following description in the specification of the present application, starting the electric drive vehicle 90 refers to starting the ECU to place the electric drive vehicle 90 in the Ready-ON state. Similarly, placing the electric drive vehicle 90 in a "Ready-OFF state" refers to a state in which the ECU of the electric drive vehicle 90 is stopped.

When the electric power is supplied to each motor generator, the control section 70 starts the first motor generator 16 to actuate the engine 20. The output of the engine 20 is distributed by the power split mechanism 22, such that a part of the output is used to drive the first motor generator 16 while the remaining output is output from the power split mechanism 22 to an output shaft 23 along with the output from the second motor generator 18 which functions as a motor, to rotate the wheels 26 for causing the electric drive vehicle 90 to travel. The first motor generator 16 functions as a power generator and generates alternating current power which is consumed as electric power for driving the second motor generator 18. At the same time, the main battery 10 is discharged to supply required electric power to the second motor generator 18. If the electric power generated by the first motor generator 16 is greater than the electric power which is necessary for the second motor generator 18, the excessive alternating current power which is generated is converted into direct current power by the inverter 15 and used to charge the main battery 10. When decelerating the electric drive vehicle 90, the second motor generator 18 functions as a power generator and reduces the rotation of the wheels 26. The alternating current power generated at this time is converted by the inverter 15 into direct-current electric power for charging the main battery 10.

Basic Operation for Charging Main Battery by External Power Source

For charging the main battery 10 mounted on the electric drive vehicle 90 by the external AC power source 100, the connector 101 (AC charging plug) connected to the AC power source 100 is inserted into the connector 55 for AC power source of the electric drive vehicle 90. Upon insertion of the connector 101 into the connector 55, a connection signal from the connector 55 is input to the control section 70. The control section 70, receiving the connection signal input from the connector 55, actuates the ECU and turns the system main relay 13 ON to place the electric drive vehicle 90 in a Ready-ON state in which each piece of equipment becomes operable. The control section 70 then starts the charging device 54 and converts the AC power to direct-current electric power for charging the main battery 10, and also turns the charging relay 53 ON to start charging the main battery 10. Upon withdrawal of the connector 101 (AC charging plug) from the connector 55, a connection release signal from the connector 55 is input to the control section 70. Upon receiving this input signal, the control section 70 stops the charging device 54 and also turns the charging relay 53 OFF, to place the electric drive vehicle 90 into a Ready-OFF state; that is, a state in which the ECU is stopped. For charging the main battery 10 by the external DC power source 102, similar to the case of charging the main battery 10 by the external AC power source 100, upon insertion of the connector 103 (DC charging plug) into the connector 56, a connection signal from the connector 56 is input to the control section 70 to place the electric drive vehicle 90 in the Ready-ON state, and the charging relay 53 is turned ON so that the main battery 10 is charged by the DC power source 102. When the connector 103 (DC charging plug) is withdrawn from the connector 56, a connection release signal from the connector 56 is input to the control section 70. Upon receiving this input signal, the control section 70 turns the charging relay 53 OFF to place the electric drive vehicle 90 in the Ready-OFF state.

As described above, the external charging operation for charging the main battery 10 by the external power source, which is the AC power source 100 or the DC power source 102, places the electric drive vehicle 90 in the Ready-ON state and the operation for releasing the external charging places the electric drive vehicle 90 in the Ready-OFF state.

Power Supply to Cooling Fan and Charging of Auxiliary Battery

As described above, various accessories (e.g., an air conditioner) including the cooling fan 40 are driven with the direct-current electric power supplied from the low-voltage bus bar 34 and 35 connected to the auxiliary battery 36. The voltage of the auxiliary battery 36 is reduced when the auxiliary battery 36 is discharged for supplying power to the cooling fan 40 and other accessories. In this case, the control section 70 actuates the DC/DC converter 33 and decreases the direct current voltage of the main battery 10 for charging the auxiliary battery 36, so that low voltage direct-current electric power can be supplied to the accessories. Charging the auxiliary battery 36 by the main battery 10 causes a reduction in the remaining capacity (SOC) of the main battery 10. Thus, driving the accessories such as the cooling fan 40 causes a reduction in the remaining capacity (SOC) of the main battery 10. Consequently, the operation of the cooling fan 40 during charge of the main battery 10 by the external power source may cause a disadvantage in that the power for charging the main battery 10 is consumed as the power for charging the auxiliary battery 36 or as the power for driving the cooling fan 40, leading to prolongation of the charge time.

Driving Control of Cooling Fan

Figure 2:
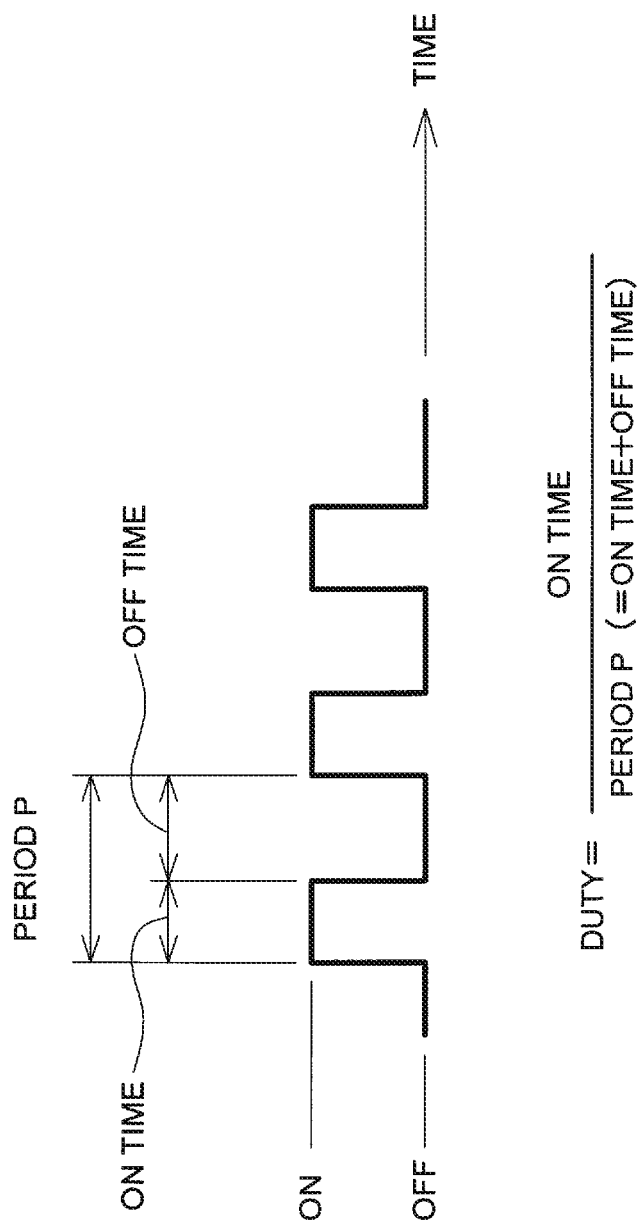
FIG. 2 is an explanatory view for explaining duty control.

The rotation speed of the motor 44 of the cooling fan 40 is adjusted based on duty control. According to the duty control, application of the voltage to the motor 44 is periodically turned ON and OFF to change the duty, which is a ratio of ON time with respect to an ON/OFF period P (=ON time+OFF time), as illustrated in FIG. 2. The duty is represented by the following Formula 1.

$$\text{Duty} = \frac{\text{ON TIME}}{\text{PERIOD } P \ (= \text{ON TIME} + \text{OFF TIME})} \quad [\text{Formula 1}]$$

If the duty is 0, no voltage is applied to the motor 44 and the cooling fan 40 would not be driven. If the duty is 100% (the MAX duty), the voltage of the low-voltage bus bars 34 and 35 is directly applied to the motor 44. If the duty is between 0 and 100%, the voltage obtained by multiplying the voltage of the low-voltage bus bars 34 and 35 with the duty is an average voltage to be applied to the motor 44.

Figure 3:
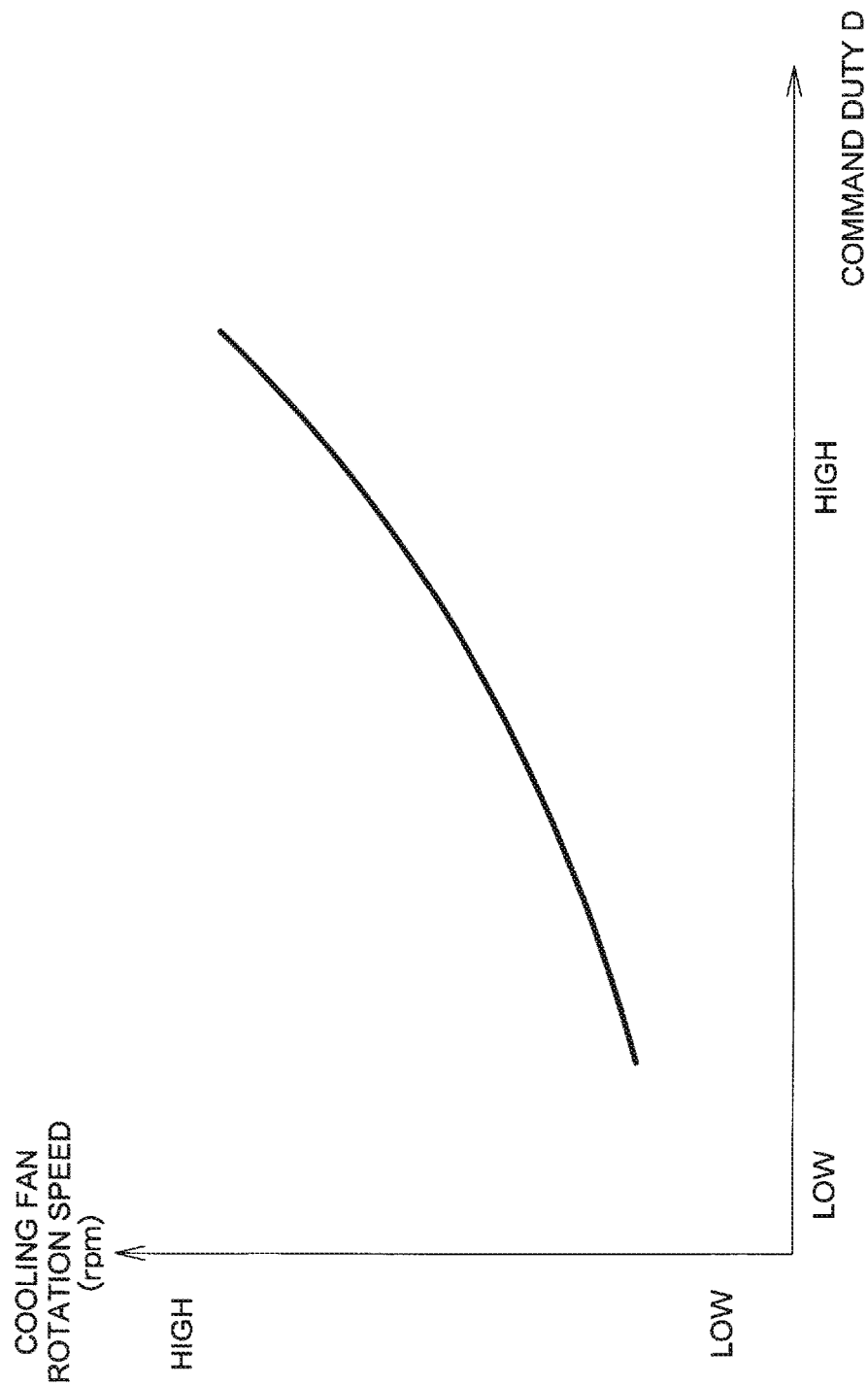
FIG. 3 is a graph showing a rotation speed of a cooling fan with respect to a command duty.

As a certain correlation is established between the rotation speed of the motor 44 and the duty, as illustrated in FIG. 3, adjustment of the duty according to the duty control enables adjustment of the rotation speed of the motor 44; that is, the rotation speed of the cooling fan 40, to a desirable rotation speed. As a certain correlation is also established between the rotation speed and the airflow rate of the cooling fan 40, adjustment of the duty also enables adjustment of the airflow rate of the cooling fan 40 to a desired rate. The control unit 45 of the cooling fan 40 contains therein a switching element which turns on and off the electric current, and turns on and off the current to be supplied to the motor 44 in accordance with a command duty D input from the control section 70. Accordingly, the command duty D is a command value for driving the cooling fan 40.

Figure 4:
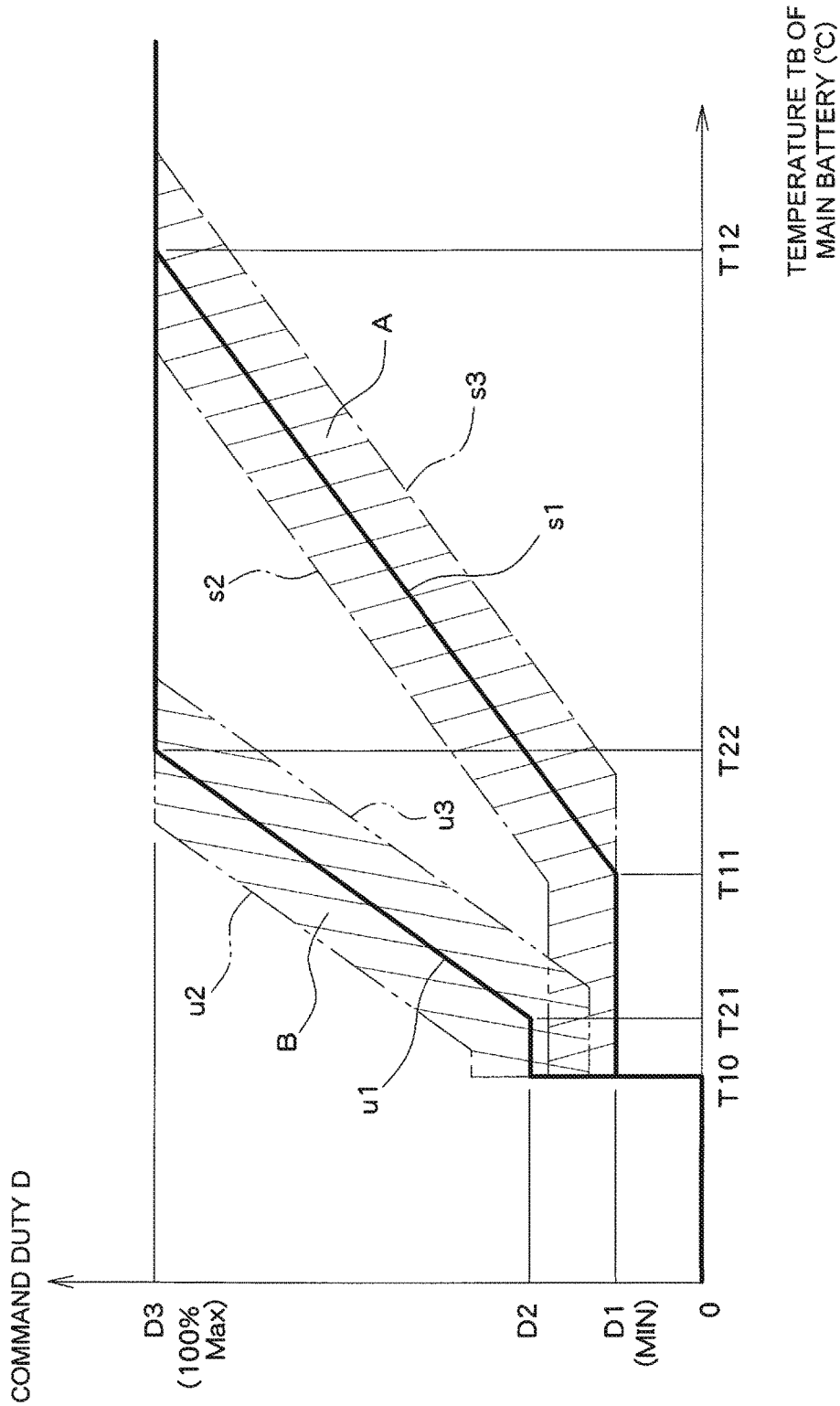
FIG. 4 is a duty map for determining the command duty.

The control section 70, based on a duty map in accordance with detection parameters including the temperature TB of the main battery 10, a temperature difference $\Delta T$ between the temperature of intake air of the cooling fan 40 detected by the temperature sensor 66 and the temperature TB of the main battery 10 detected by the temperature sensor 61, the vehicle speed Vel detected by the vehicle speed sensor 65, and other parameters, determines the command duty D of the cooling fan 40 and outputs the determined command duty D to the control unit 45. Among various duty maps that are applicable, one example map is illustrated in FIG. 4. Solid line s1 in FIG. 4 is a reference line which defines a command duty D with respect to the temperature TB of the main battery 10 in a case where the outside-air temperature is in the vicinity of room temperature and the temperature difference $\Delta T$ between the battery temperature TB of the main battery 10 and the temperature of the intake air of the cooling fan 40 is great. In this case, as shown by solid line s1 in FIG. 4, the command duty D is set to zero until the temperature TB of the main battery 10 reaches temperature T10 and set to the minimum value D1 (MIN) when the temperature of the main battery 10 is between temperature T10 and temperature T11. The minimum value D1 is a minimum duty value for controlling the rotation speed of the motor 44 in a stable manner according to the duty control, and is about 10%, for example. When the temperature TB of the main battery 10 exceeds temperature T11, the command duty D increases with an increase in the battery temperature TB, and when the temperature TB of the main battery 10 reaches temperature T12, the command duty D becomes the maximum value D3 (MAX, 100% duty). The temperatures T10, T11, and T12 can have various values depending on the properties of the battery 10, battery type (nickel metal hydride battery or lithium ion battery), and the like. For example, T10 is about 38° C., T11 is about 40° C., and T12 is about 45° C.

The command duty D is determined in consideration of the detected parameters such as the vehicle speed Vel of the electric drive vehicle 90, in addition to the temperature TB of the main battery 10. If the vehicle speed Vel of the electric drive vehicle 90 is high, for example, the necessary power is large and input and output power of the main battery 10 is therefore large, and therefore the command duty D is increased from solid line s1 to dashed line s2 in FIG. 4. If the vehicle speed Vel of the electric drive vehicle 90 is low, on the other hand, the necessary power is small and the input and output power of the main battery 10 is not very large, and therefore the command duty D is decreased from solid line s1 to dashed and single-dotted line s3 in FIG. 4. As described above, the command duty D varies within a region A which is hatched between dashed and single-dotted lines s2 and s3 in FIG. 4 in accordance with the detected parameters such as the vehicle speed Vel of the electric drive vehicle 90 even when the temperature difference $\Delta T$ between the temperature TB of the main battery 10 and the intake air temperature of the cooling fan 40 is fixed.

When the outside-air temperature is high and the temperature difference ΔT between the temperature TB of the main battery 10 and the intake air temperature of the cooling fan 40 is small, a greater airflow rate is necessary for cooling the main battery 10. In this case, a reference line for defining the command duty D for determining the temperature TB of the main battery 10 indicated by solid line u1 sets the duty to a higher level than the solid line s1 described above. Specifically, the command duty D is set to zero until the temperature TB of the main battery 10 reaches temperature T10, and is set to D2 when the temperature of the main battery 10 is between temperature T10 and temperature T21 (which is lower than T11). D2 is a duty value with which the airflow rate that is necessary for cooling the main battery 10 can be supplied when the temperature difference ΔT between the temperature TB of the main battery 10 and the intake air temperature of the cooling fan 40 is small. When the temperature TB of the main battery 10 exceeds temperature T21, the command duty D increases with an increase in the battery temperature TB. When the battery temperature TB reaches temperature T22, the command duty D reaches the maximum value D3 (MAX, 100% duty). At this time, the ratio of the increase in the command duty with respect to the battery temperature TB is larger than that of the example case of solid line s1 which has been described above. As with the case in which the temperature difference ΔT is great which has been described above, the command duty D varies within a region B which is hatched between dashed and double-dotted lines u2 and u3 in FIG. 4 in accordance with the vehicle speed Vel of the electric drive vehicle 90 and other parameters. Similar to temperatures T10, T11, and T12, temperatures T21 and T22 can be various values. For example, T21 may be about 37° C. and T22 may be about 42° C.

The control section 70 determines the command duty D of the cooling fan 40 (command value for driving the cooling fan 40) based on the duty map described above and outputs the command duty D which is determined to the control unit 45. Thus, the command duty D varies depending on the temperature of the main battery 10, the temperature difference ΔT between the temperature TB of the main battery 10 and the intake air temperature of the cooling fan 40, the vehicle speed Vel, and various other parameters.

Basic Operation of Cooling System for on-Vehicle Secondary Battery

Figure 5:
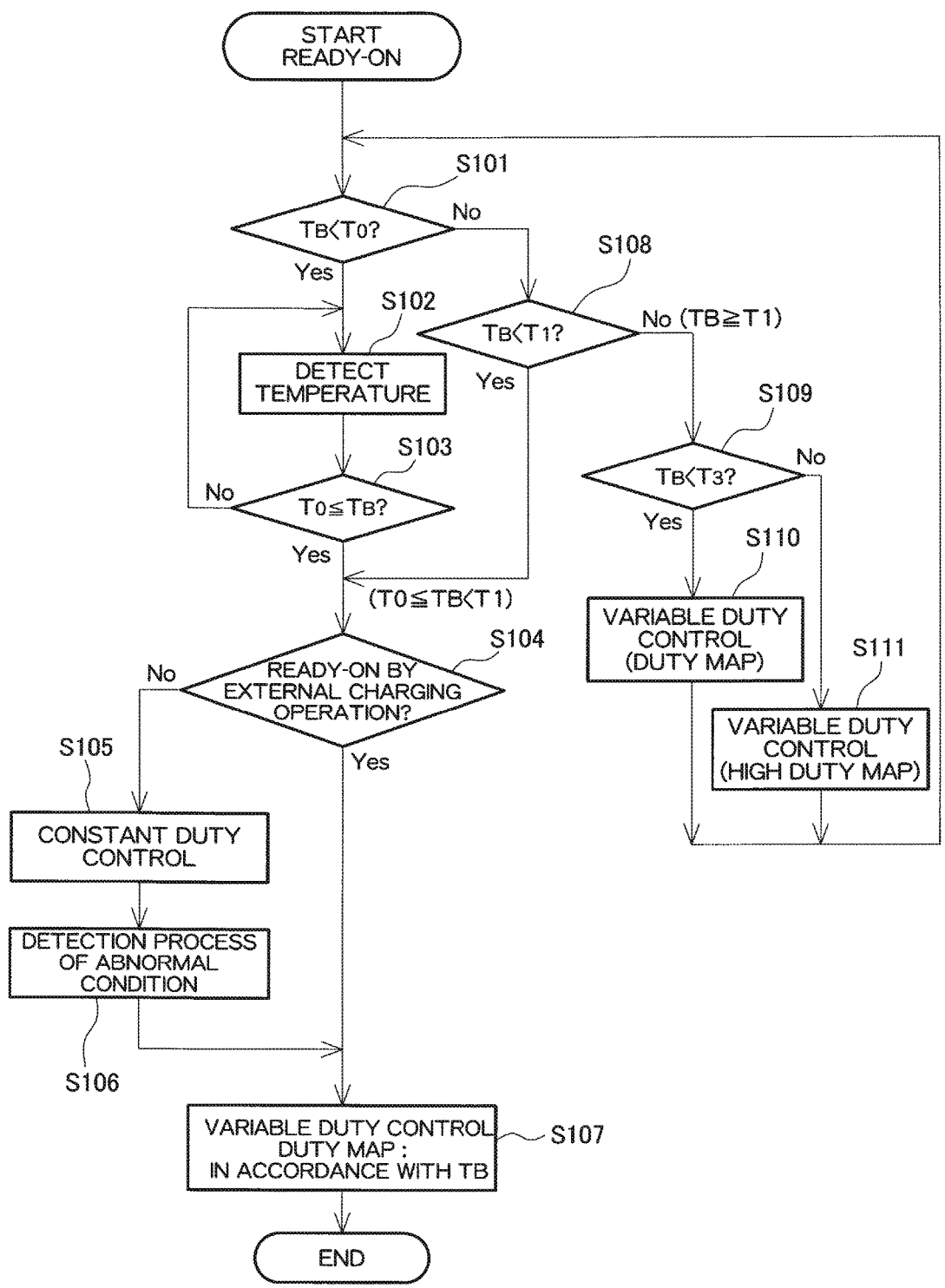
FIG. 5 is a flowchart showing the operation of the cooling system for an on-vehicle secondary battery according to the embodiment of the present invention.

With reference to FIG. 5, the operation of the cooling system 80 for the on-vehicle secondary battery will be described. When the electric drive vehicle 90 is placed in the Ready-ON state (a state in which the electric drive vehicle 90 is started and the ECU is actuated) by operating the ignition switch 27 ON or connecting the connector 101 or 103 of the external power source to the connector 55 or 56 of the electric drive vehicle 90, the control section 70 detects the temperature TB of the main battery 10 from the temperature sensor 61 and compares the temperature TB with a first predetermined temperature T0, as shown in step S101 in FIG. 5. The first predetermined temperature T0 is a temperature at which cooling of the main battery 10 is not necessary and cooling of the main battery 10 by driving the cooling fan 40 may cause overcooling of the main battery 10. The first predetermined temperature T0 is set to about 36° C., for example.

If the temperature TB of the main battery 10 is lower than the first predetermined temperature T0, the control section 70 determines YES in step S101, and the process proceeds to steps S102 and S103 in FIG. 5. Specifically, the control section 70 detects the temperature TB of the main battery 10, and waits until the temperature TB of the main battery 10 is equal to or higher than the first predetermined temperature T0. If the temperature TB of the main battery 10 rises to the first predetermined temperature T0, the control section 70 determines YES in step S103 in FIG. 5 and the process proceeds to step S104 in FIG. 5, where the control section 70 determines whether or not the electric drive vehicle 90 has been placed in the Ready-ON state by connecting the connector 101 or 103 of the external power source to the connector 55 or 56 of the electric drive vehicle 90; that is, whether or not the Ready-ON state is caused by an external charging operation.

The control section 70, determining the Ready-ON triggered by an external charging operation (determining YES in step S104 in FIG. 5), inhibits constant duty control of the cooling fan 40, and the process proceeds to step S107 in FIG. 5 where the control section 70 performs variable duty control of the cooling fan 40 in accordance with the duty map shown in FIG. 4. If the control section 70 determines that the Ready-ON state has been caused by operating the ignition switch 27 ON, rather than by the external charging operation (NO is determined in step S104 in FIG. 5), on the other hand, the process proceeds to step S105 in FIG. 5, where the control section 70 performs constant duty control for driving the cooling fan 40 for a predetermined period at a constant duty, and further proceeds to step S106, where the control section 70 performs detection process of abnormal condition for detecting presence or absence of abnormal condition of the cooling fan 40.

In the detection process of abnormal condition, during a predetermined period in which the constant duty control of the cooling fan 40 is being performed, the actual rotation speed of the motor 44; that is, the actual rotation speed of the cooling fan 40, is detected by the rotation speed sensor 64 shown in FIG. 1, and a fixed target rotation speed based on the command duty D and the actual rotation speed are compared with each other. If the difference or an absolute value of the difference between these rotation speeds is equal to or greater than a predetermined threshold value, based on the determination that abnormal condition is occurring in the cooling fan 40, a fan abnormal condition signal is output to a diagnostic unit, for example. If the difference is below the predetermined threshold value, based on the determination that the cooling fan 40 has no abnormal condition (normal condition), a fan normal signal is output to the diagnostic unit, for example. Here, the predetermined period refers to a period in which it is possible to determine the difference between the actual rotation speed of the cooling fan 40 and the target rotation speed based on the command duty, and is about several tens of seconds to several minutes, for example.

If the temperature TB of the main battery 10 is equal to or higher than the first predetermined temperature T0, the control section 70 determines NO in step S101, and the process proceeds to step S108 in FIG. 5, where the control section 70 further determines whether or not the temperature TB of the main battery 10 is below a second predetermined temperature T1. The second predetermined temperature T1 is a temperature at which driving the cooling fan 40 with a constant command duty D would not affect the main battery 10, and is about 40° C., for example. If the temperature TB of the main battery 10 is below the second predetermined temperature T1, the control section 70 determines YES in step S108 in FIG. 5 and the process proceeds to step S104 in FIG. 5, where the control section 70 determines whether or not the electric drive vehicle 90 has been placed in the Ready-ON state by an external charging operation. As described above, the control section 70, when determining the Ready-ON caused by an external charging operation, inhibits the constant duty control of the cooling fan 40, and the process proceeds to step S107 in FIG. 5, where the control section 70 performs variable duty control of the cooling fan 40. If it is determined that the Ready-ON state has been caused by an operation other than an external charging operation, the process proceeds to step S105 in FIG. 5, where the control section 70 performs constant duty control for driving the cooling fan 40 for the predetermined period at a constant duty, and the process further proceeds to step S106 where the control section 70 performs detection process of abnormal condition for detecting presence or absence of abnormal condition of the cooling fan 40.

If the temperature TB of the main battery 10 at the time of Ready-ON is equal to or higher than the second predetermined temperature T1 and below a fourth predetermined temperature T3, the control section 70 determines YES in step S109 in FIG. 5, and the process proceeds to step S110 in FIG. 5 where the control section 70 drives the cooling fan 40 based on variable duty control in which the command duty D is varied within a region A (normal duty map) in the duty map shown in FIG. 4, which defines the command duty D with respect to the temperature TB of the main battery 10 when the outside-air temperature is near room temperature and the temperature difference ΔT between the temperature TB of the main battery 10 and the intake air temperature of the cooling fan 40 is great. On the other hand, if the temperature TB of the main battery 10 at the time of Ready-ON is equal to or higher than the fourth predetermined temperature T3, the control section 70 determines NO in step S109 in FIG. 5, and the process proceeds to step S111 in FIG. 5, where the control section 70 drives cooling fan 40 based on the variable duty control in which the command duty D is varied within a region B (high duty map) in the duty map shown in FIG. 4, which defines the command duty D with respect to temperature TB of the main battery 10 when the outside-air temperature is high and the temperature difference ΔT between the temperature TB of the main battery 10 and the intake air temperature of the cooling fan 40 is small. The fourth predetermined temperature T3 is a temperature at which it is necessary to cool the main battery 10 quickly, and may be about 45° C., for example.

Once the control section 70 starts the variable duty control in which the command duty is varied based on the duty map shown in FIG. 4 in steps S110 and S111 in FIG. 5, the process returns to step S101 in FIG. 5, where the control section 70 monitors the temperature TB of the main battery 10. If the temperature TB of the main battery 10 is below the fourth predetermined temperature T3, the variable duty control based on the high duty map is shifted to the variable duty control based on the normal duty map. Further, if the temperature of the main battery 10 is below the second predetermined temperature T1, the control section 70 determines YES in step S108 in FIG. 5, and the process jumps to step S104 in FIG. 5 where the control section 70 determines whether or not the Ready-ON state is caused by an external charging operation. If the Ready-ON caused by an external charging operation is determined in step S104, the control section 70 inhibits the constant duty control of the cooling fan 40, and if it is determined that the Ready-ON is not triggered by an external charging operation, the control section 70 performs the constant duty control of the cooling fan 40 as shown in step S105, and the process further proceeds to step S106 where the control section 70 performs the detection process of abnormal condition of the cooling fan 40.

After the control section 70 performs the detection process of abnormal condition of the cooling fan 40 in step S106 in FIG. 5, the process proceeds to step S107 in FIG. 5 where the control section 70 performs variable duty control of the cooling fan 40 based on the duty map in FIG. 4, and terminates the operation shown in the flowchart of FIG. 5. If, during execution of the operations shown in the flowchart of FIG. 5, the ignition switch 27 is operated OFF to stop the ECU and place the vehicle in the Ready-OFF state, the control section 70 suspends the execution of the flowchart in FIG. 5 and terminates the operation.

As the cooling system 80 for the on-vehicle secondary battery according to the present embodiment inhibits the constant duty control of the cooling fan 40 when the Ready-ON state has been caused by an external charging operation, there can be prevented consumption of the electric power of the main battery 10 as power for charging the auxiliary battery 36 or as drive power for driving the cooling fan 40 during the charge of the main battery 10 to extend the charge time. Further, in a case where the Ready-ON state has been caused by an operation other than the external charging operation, the cooling system 80 for the on-vehicle secondary battery according to the present embodiment inhibits the constant duty control of the cooling fan 40 if the temperature TB of the main battery 10 at the time of Ready-ON is equal to or higher than the second predetermined temperature T1, whereas the cooling system 80 for the on-vehicle secondary battery performs the constant duty control for driving the cooling fan 40 for the predetermined period at the constant duty and executes the detection process of abnormal condition for detecting presence or absence of abnormal condition of the cooling fan 40 if the temperature TB of the main battery 10 at the time of Ready-ON is equal to or higher than the first predetermined temperature T0 and below the second predetermined temperature T1. As such, opportunities for the detection process of abnormal condition of the cooling fan 40 are secured at the time of starting the electric drive vehicle 90, and, when the temperature TB of the main battery 10 at the time of starting the electric drive vehicle 90 is high, a higher priority is given to cooling of the main battery 10 than to acquisition of the opportunities of the detection process of abnormal condition of the cooling fan 40, to thereby prevent deterioration of the main battery 10. It is therefore possible to cool the main battery 10 appropriately while securing the opportunities of detection of presence or absence of abnormal condition of the cooling fan 40.

Specific Example Operations of Cooling System for on-Vehicle Secondary Battery

The basic operation and the detection process of abnormal condition of the cooling system for the on-vehicle secondary battery have been described. The specific example operations of the cooling system for the on-vehicle secondary battery at various temperatures TB of the main battery 10 at the time of Ready-ON will be now described with reference to FIG. 6A to FIG. 8B. In the following description, the third predetermined temperature T2 is lower than the second predetermined temperature T1, and if the temperature TB of the main battery 10 exceeds the third predetermined temperature T2, the command duty D of the cooling fan 40 is set to D3.

When Main Battery Temperature TB is Lower than First Predetermined Temperature T0

Figure 6A:
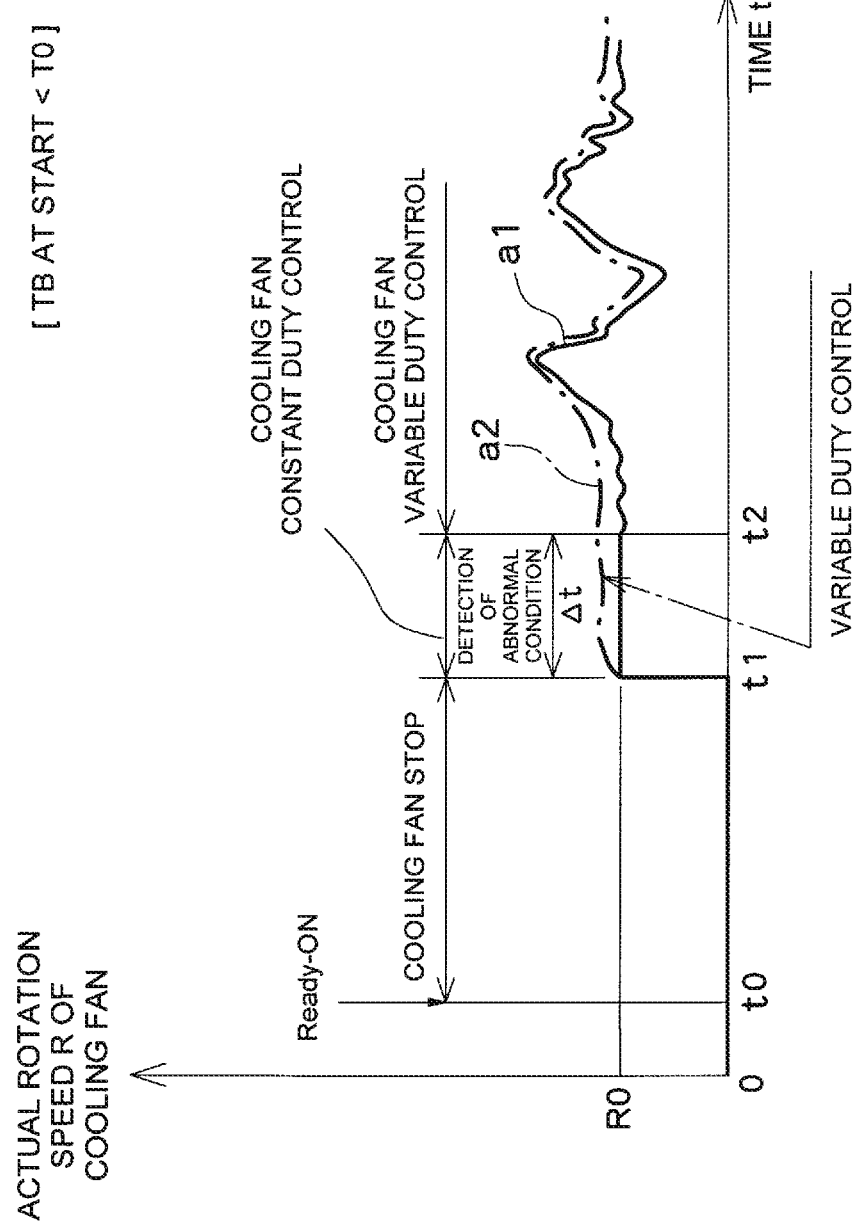
FIG. 6A is a time chart showing a change in the rotation speed of the cooling fan when the temperature of a main battery at the time of vehicle start up is below a first predetermined temperature T0.
Figure 6B:
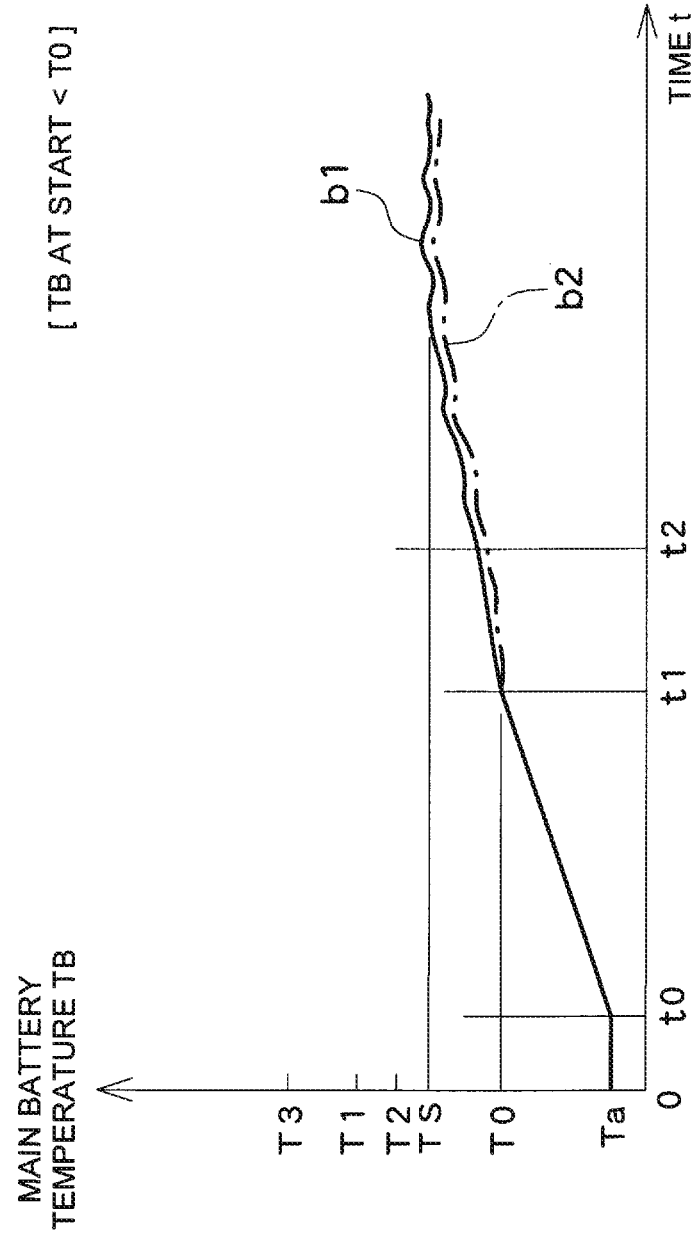
FIG. 6B is a time chart showing a change in the temperature of the main battery when the temperature of the main battery at the time of vehicle start up is below the first predetermined temperature T0.

Referring to FIGS. 6A and 6B, there will first be described the operation of the cooling system for the on-vehicle secondary battery when the temperature TB of the main battery 10 is lower than the first predetermined temperature T0 at the time of Ready-ON. At time t0 in FIGS. 6A and 6B, operating the ignition switch 27 ON or connecting the connector 101 shown in FIG. 1 to the connector 55 or connecting the connector 103 to the connector 56 places the electric drive vehicle 90 in a Ready-ON state. Immediately before time t0, the electric drive vehicle 90 is in a Ready-OFF state, and the electric drive vehicle 90 and the cooling fan 40 are stopped and the rotation speed of the cooling fan 40 is zero. Also, immediately before time t0, the temperature TB of the main battery 10 is temperature Ta which is lower than the first predetermined temperature T0. The solid line a1 shown in FIG. 6A shows a change in the rotation speed R of the cooling fan 40 with time in the case of Ready-ON not triggered by an external charging operation; the dashed and single-dotted line a2 in FIG. 6A shows a change in the rotation speed R of the cooling fan 40 with time in the case of Ready-ON triggered by an external charging operation; the solid line b1 shown in FIG. 6B shows a change in the temperature TB of the main battery 10 with time in the case of Ready-ON not triggered by an external charging operation; and the dashed and single-dotted line b2 shown in FIG. 6B shows a change in the temperature TB of the main battery 10 with time in the case of Ready-ON triggered by an external charging operation.

When the electric drive vehicle 10 is placed in the Ready-ON state at time t0, the control section 70 detects the temperature TB of the main battery 10 by the temperature sensor 61 and compares the temperature TB with the first predetermined temperature T0, as shown in step S101 in FIG. 5. In the example shown in FIGS. 6A and 6B, as the temperature TB of the main battery 10 is a temperature Ta, which is lower than the first predetermined temperature T0, the control section 70 determines YES in step S101 in FIG. 5, and the process proceeds to steps S102 and S103 in FIG. 5 where the control section 70 detects the temperature TB of the main battery 10, and waits until the temperature TB of the main battery 10 becomes equal to or higher than the first predetermined temperature T0. When the ignition switch 27 is operated ON to place the electric drive vehicle 90 in the Ready-ON state at time t0 and the electric drive vehicle 90 starts traveling from time t0, the main battery 10 is discharged to supply electric power to the second motor generator 18 or charged with the electric power generated by the first motor generator 16, so that, as indicated by solid line b1 in FIG. 6B, the temperature TB of the main battery 10 gradually rises. In the case of the Ready-ON triggered by an external charging operation, charge of the main battery 10 starts at time t0, so that the temperature of the main battery 10 rises. At time t1 shown in FIG. 6B, the temperature TB of the main battery 10 rises to the first predetermined temperature T0; that is, TB=T0. Then, the control section 70 determines YES in step S103 in FIG. 5, and the process proceeds to step S104 in FIG. 5, where the control section 70 determines whether or not the Ready-ON state has been caused by an external charging operation.

If the Ready-ON has been triggered by an external charging operation, the control section 70 inhibits the constant duty control of the cooling fan 40 and the process proceeds to step S107 in FIG. 5 where the cooling fan 40 is controlled based on the variable duty control. In this case, as indicated by dashed and single-dotted line a2 in FIG. 6A, after time t1, the rotation speed R of the cooling fan 40 varies. Also, as indicated by dashed and single-dotted line b2 in FIG. 6B, after time t1, the temperature TB of the main battery 10 gradually rises and reaches a normal operation temperature TS after a while.

If the Ready-ON state has been caused by operating the ignition switch 27 ON, rather than by an external charging operation, the process proceeds to step S105 in FIG. 5, where the control section 70 performs constant duty control of the cooling fan 40 for driving the cooling fan 40 at a constant duty for a predetermined time period, and the process further proceeds to step S106 in FIG. 5 where the control section 70 performs detection process of abnormal condition for detecting presence or absence of abnormal condition of the cooling fan 40. In the example shown in 6B, as the temperature TB of the main battery 10 at time t0 is Ta which is lower than the first predetermined temperature T0, the command duty D is maintained at the minimum value D1 for a predetermined time period $\Delta t$ shown in FIG. 6A. The minimum value D1 of the command duty D is lower than the command value which is set during the variable duty control corresponding to the temperature TB of the main battery 10. Therefore, the rotation speed R0 of the cooling fan 40 in the case of the constant duty control at the command duty D1, which is shown by solid line a1 in FIG. 6A is lower than the rotation speed of the cooling fan 40 during the variable duty control shown by dashed and single-dotted line a2 in FIG. 6A. As shown by solid line a1 of FIG. 6A, for the predetermined period $\Delta t$, the cooling fan 40 is controlled at the rotation speed R0 (minimum rotation speed). During this period, the control section 70, based on a difference between the actual rotation speed of the cooling fan 40 and the target rotation speed based on the command duty D, detects presence or absence of abnormal condition of the cooling fan 40.

If the constant duty control and the detection process of abnormal condition of the cooling fan 40 are completed at time t2 in FIGS. 6A and 6B, the process proceeds to step S107 in FIG. 5 where the control section 70 performs the variable duty control of the cooling fan 40 based on the duty map shown in FIG. 4 and then terminates the operation of the program. Consequently, as indicated by solid line a1 in FIG. 6A, the rotation speed R of the cooling fan 40 significantly varies in accordance with the temperature of the main battery 10 and other parameters. The temperature of the main battery 10, on the other hand, is controlled in the vicinity of the normal operation temperature TS as indicated by solid line b1 in FIG. 6B.

When Main Battery Temperature TB is Equal to or Higher than First Predetermined Temperature T0 and Equal to or Lower than Third Predetermined Temperature T2

Figure 7A:
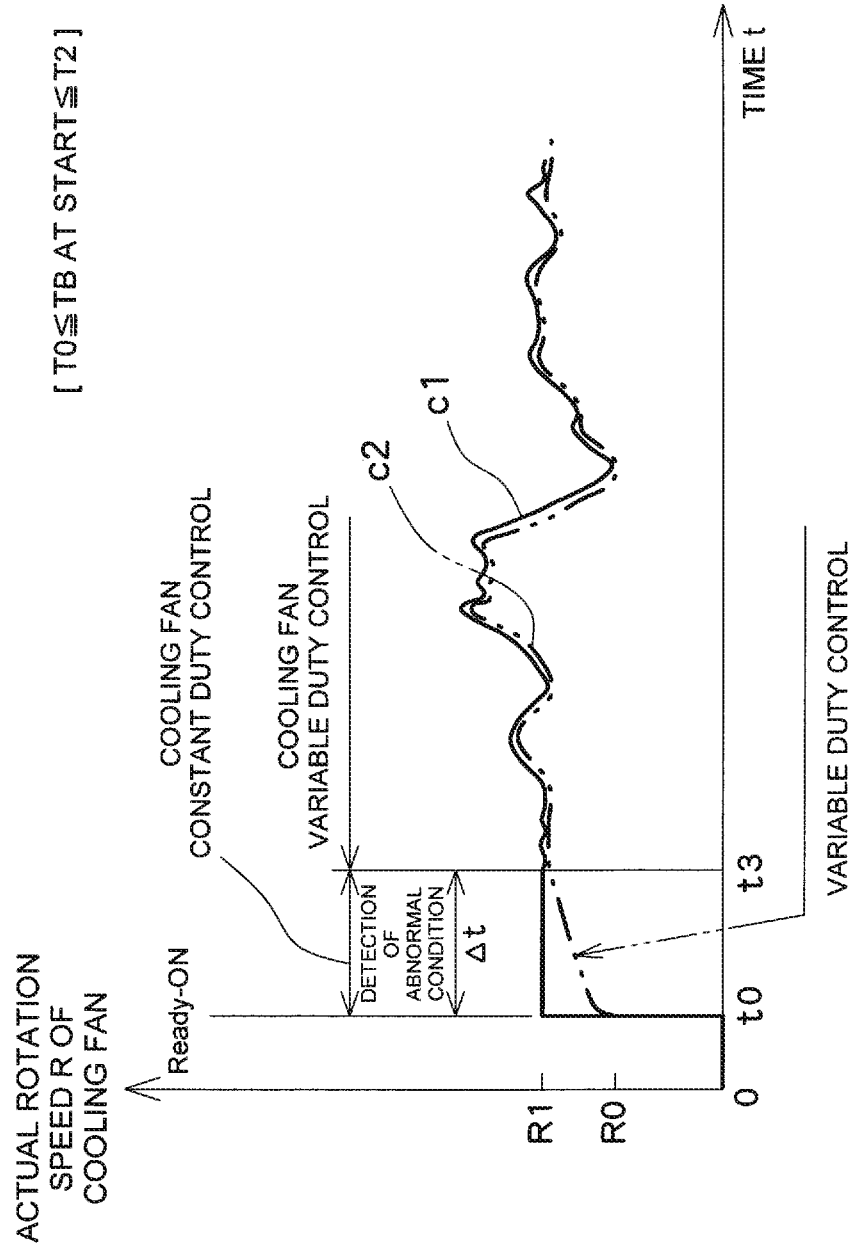
FIG. 7A is a time chart showing a change in the rotation speed of the cooling fan when the temperature of the main battery at the time of vehicle start up is equal to or higher than the first predetermined temperature T0 and is equal to or lower than a third predetermined temperature T2.
Figure 7B:
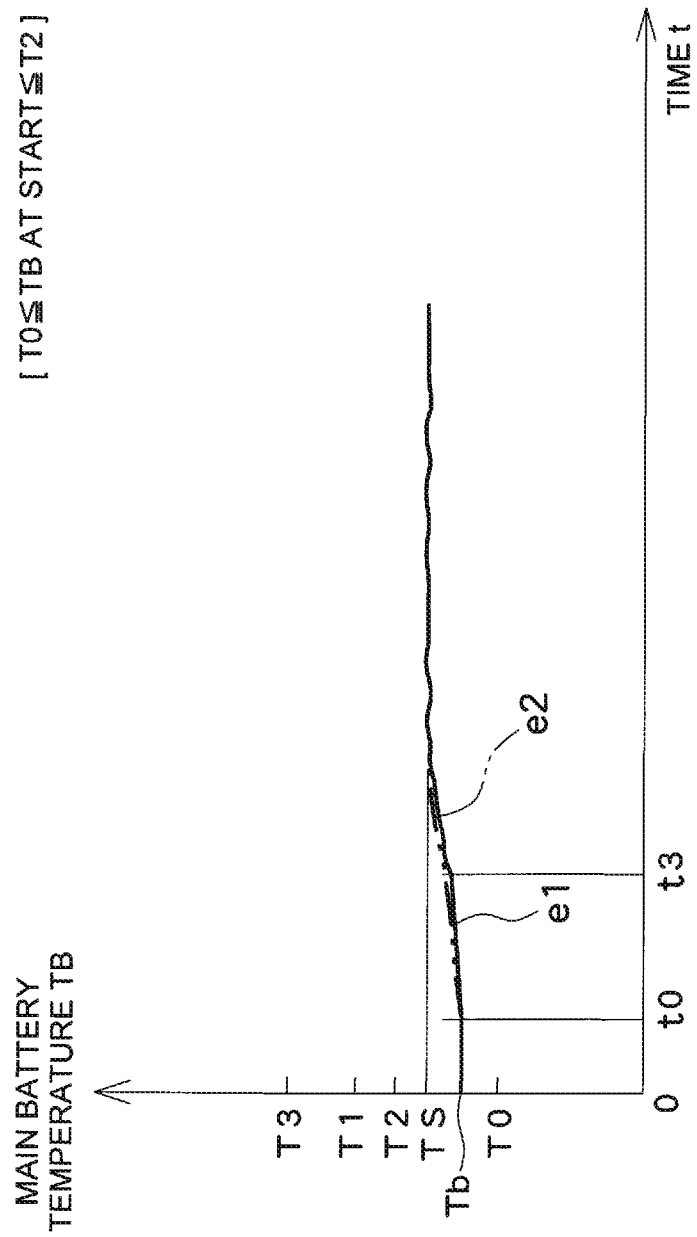
FIG. 7B is a time chart showing a change in the temperature of the main battery when the temperature of the main battery at the time of vehicle start up is equal to or higher than the first predetermined temperature T0 and is equal to or lower than the third predetermined temperature T2.

Referring now to FIGS. 7A and 7B, there will be described the operation of the cooling system for the on-vehicle secondary battery when the temperature TB of the main battery 10 at the time of Ready-ON is equal to or higher than the first predetermined temperature T0 and is equal to or lower than the third predetermined temperature T2. In FIGS. 7A and 7B, similar to FIGS. 6A and 6B, at time t0, the electric drive vehicle 90 is placed in the Ready-ON state. As shown in FIG. 7B, at time immediately before time t0, the temperature TB of the main battery 10 is temperature Tb which is equal to or higher than the first predetermined temperature T0 and is equal to or lower than the third predetermined temperature T2. The third predetermined temperature T2 is below the second predetermined temperature T1. In FIG. 7B, an example case of T0<TB<T2<T1 is shown. In FIG. 7A, solid line c1 shows a change in the rotation speed R of the cooling fan 40 with time in the case of Ready-ON not caused by an external charging operation and dashed and double-dotted line c2 shows a change in the rotation speed R of the cooling fan 40 with time in the case of Ready-ON triggered by an external charging operation. In FIG. 7B, solid line e1 shows a change in the temperature TB of the main battery 10 with time in the case of Ready-ON not caused by an external charging operation and dashed and double-dotted line e2 shows a change in the temperature TB of the main battery 10 with time in the case of Ready-ON triggered by an external charging operation.

When the electric drive vehicle 10 is placed in the Ready-ON state at time t0, the control section 70 detects the temperature TB of the main battery 10 by the temperature sensor 61 and compares the temperature TB with the first predetermined temperature T0, as shown in step S101 in FIG. 5. In the example shown in FIGS. 7A and 7B, as the temperature TB of the main battery 10 is a temperature Tb, which is between the first predetermined temperature T0 and the third predetermined temperature T2, the control section 70 determines NO in step S101 in FIG. 5, and the process proceeds to step S108 in FIG. 5. As shown in FIG. 7B, the temperature TB is lower than the second predetermined temperature T1, the control section 70 determines YES in step S108 in FIG. 5, and the process proceeds to step S104 in FIG. 5 where the control section 70 determines whether or not the Ready-ON has been triggered by an external charging operation.

If Ready-ON has been triggered by an external charging operation, the control section 70 inhibits the constant duty control of the cooling fan 40 and the process proceeds to step S107 in FIG. 5 where the cooling fan 40 is controlled based on the variable duty control. In this case, as indicated by dashed and double-dotted line c2 in FIG. 7A, at time t0, the rotation speed R of the cooling fan 40 becomes the minimum rotation speed R0 and thereafter varies with time. Also, as indicated by dashed and double-dotted line e2 in FIG. 7B, after time t0, the temperature TB of the main battery 10 gradually rises and reaches the normal operation temperature TS after a while.

If the Ready-ON state has been caused by operating the ignition switch 27 ON, rather than by an external charging operation, the process proceeds to step S105 in FIG. 5, where the control section 70 performs constant duty control of the cooling fan 40, and the process further proceeds to step S106 in FIG. 5 where the control section 70 performs detection process of abnormal condition. In the example shown in 7A and 7B, the initial temperature of the main battery 10 is higher than the first predetermined temperature T0, and the control section 70 determines whether or not the temperature TB of the main battery 10 is equal to or higher than the third predetermined temperature T2. As shown in FIG. 7B, as the temperature of the main battery 10 at the time of Ready-ON is Tb which is lower than the third predetermined temperature, the control section 70 performs the constant duty control with the command duty being set to an intermediate value DM between the minimum value D1 and the maximum value D3, and performs the detection process of abnormal condition of the cooling fan 40. At this time, the rotation speed R of the cooling fan 40 is R1 which is higher than the rotation speed R0 which is the lowest rotation speed and lower than the rotation speed R3 which is the highest rotation speed, as indicated by solid line c1 in FIG. 7A. During this period, as indicated by solid line e1 in FIG. 7B, the temperature TB of the main battery 10 gradually rises. As the rotation speed R of the cooling fan 40 is rotation speed R1 which is higher than the lowest rotation speed R0, the temperature rise of the main battery 10 is gentler than in the case of the rotation speed R0.

If the constant duty control of the cooling fan 40 and the detection process of abnormal condition are completed at time t3 when the predetermined time Δt has elapsed, the process proceeds to step S107 in FIG. 5 where the control section 70 changes the control of the cooling fan 40 to the variable duty control based on the duty map shown in FIG. 4 and then terminates the operation of the program. After time t3, as indicated by solid line c1 in FIG. 7A, the rotation speed R of the cooling fan 40 varies in accordance with the temperature of the main battery 10 and other parameters, and, after time t3, the temperature of the main battery 10 is controlled in the vicinity of the normal operation temperature TS as indicated by solid line e1 in FIG. 7B.

When Main Battery Temperature TB Exceeds Third Predetermined Temperature T2 and is Lower than Second Predetermined Temperature T1

Figure 8A:
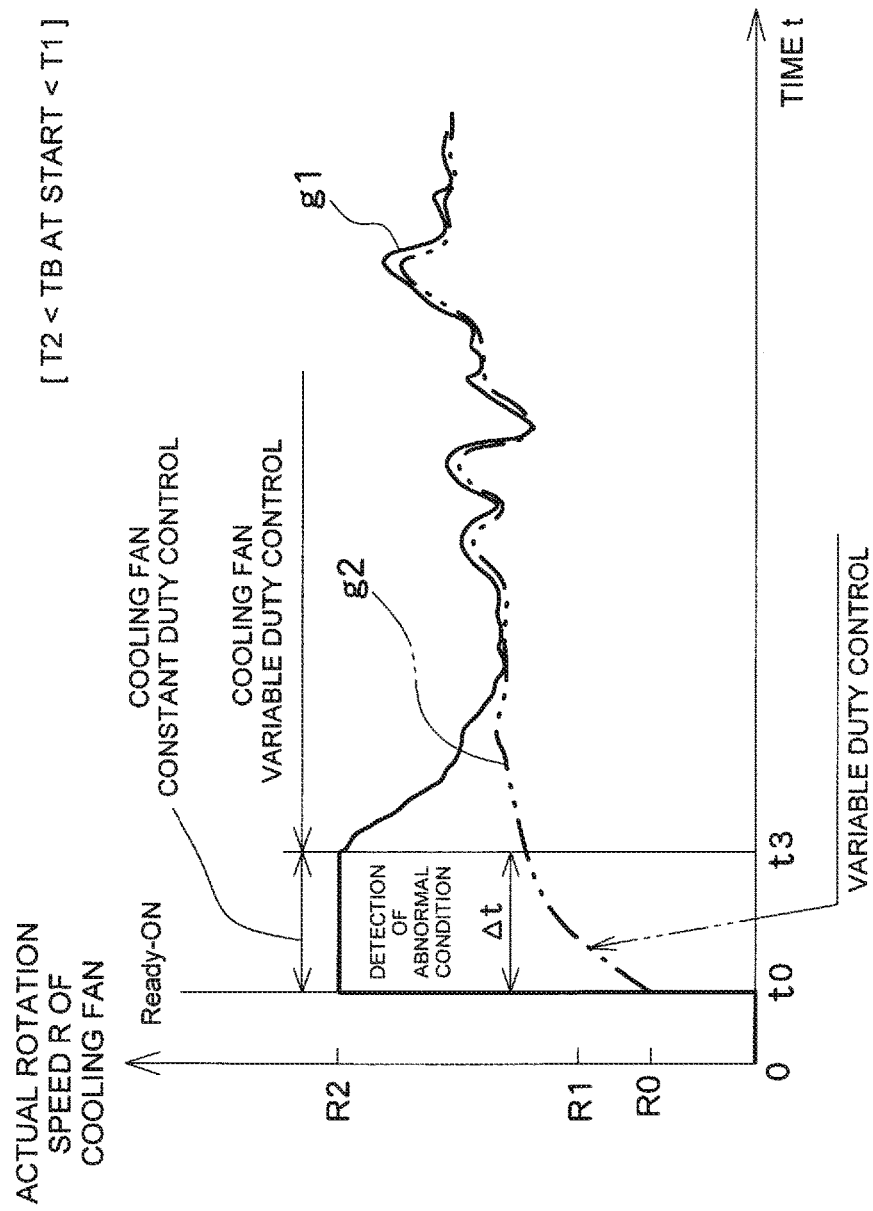
FIG. 8A is a time chart showing a change in the rotation speed of the cooling fan when the temperature of the main battery at the time of vehicle start up is higher than the third predetermined temperature T2 and is lower than the second predetermined temperature T1.
Figure 8B:
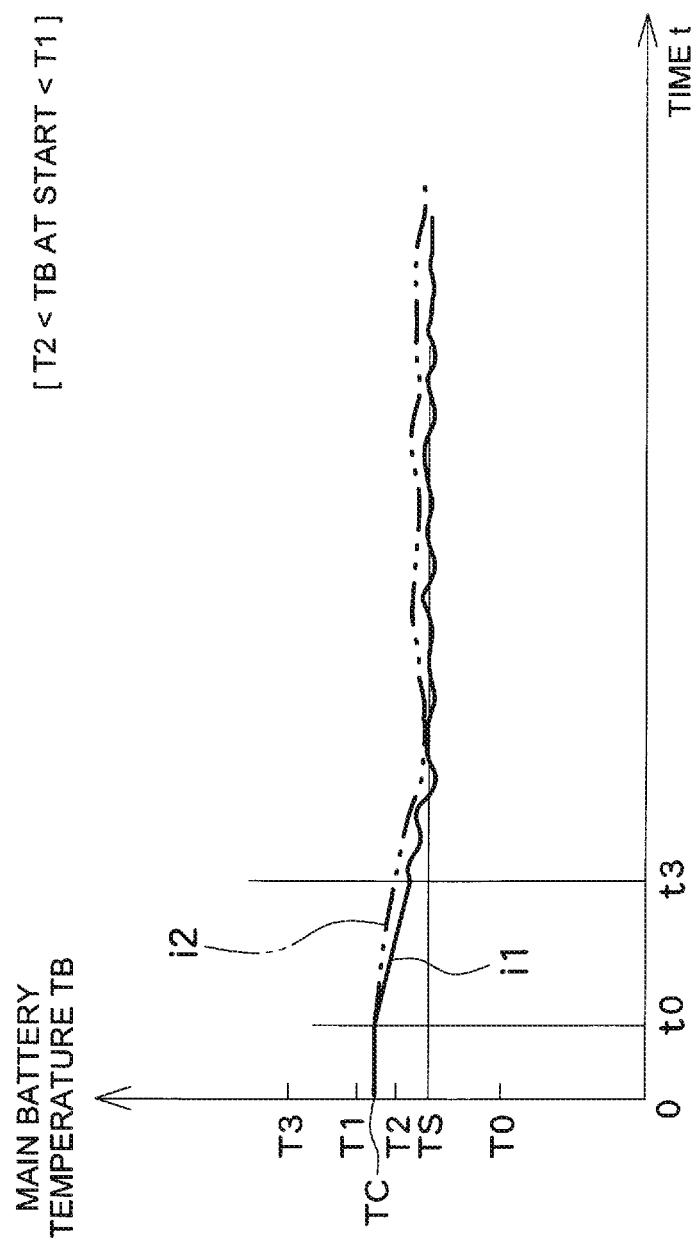
FIG. 8B is a time chart showing a change in the temperature of the main battery when the temperature of the main battery at the time of vehicle start up is higher than the third predetermined temperature T2 and is lower than the second predetermined temperature T1.

Referring now to FIGS. 8A and 8B, there will be described the operation of the cooling system for the on-vehicle secondary battery when the temperature TB of the main battery 10 at the time of Ready-ON exceeds the third predetermined temperature T2 and is lower than the second predetermined temperature T1. In FIGS. 8A and 8B, at time t0, the electric drive vehicle 90 is placed in the Ready-ON state. As shown in FIG. 8B, at a time immediately before time t0, the temperature TB of the main battery 10 exceeds the third predetermined temperature T2 and is lower than the second predetermined temperature T1. In FIG. 8B, an example case of T2<TB<T1 is shown. In FIG. 8A, solid line g1 shows the change in the rotation speed R of the cooling fan 40 with time in the case of Ready-ON not triggered by an external charging operation and dashed and double-dotted line g2 shows the change in the rotation speed R of the cooling fan 40 with time in the case of Ready-ON triggered by an external charging operation. In FIG. 8B, solid line i1 shows the change in the temperature TB of the main battery 10 with time in the case of Ready-ON not triggered by an external charging operation and also in a case where none of the specific conditions are satisfied and dashed and double-dotted line i2 indicates the change in the temperature TB of the main battery 10 with time in the case of Ready-ON triggered by an external charging operation.

When the electric drive vehicle 90 is placed in the Ready-ON state at time t0, the control section 70 detects the temperature TB of the main battery 10 by the temperature sensor 61 and compares the temperature TB with the first predetermined temperature T0, as shown in step S101 in FIG. 5. In the example shown in FIGS. 8A and 8B, as the temperature TB of the main battery 10 is a temperature Tc, which is higher than the first predetermined temperature T0 and is between the third predetermined temperature T2 and the second predetermined temperature T1, the control section 70 determines NO in step S101 in FIG. 5, and determines YES in step S108 in FIG. 5. The process then proceeds to step S104 in FIG. 5 where the control section 70 determines whether or not the Ready-ON has been triggered by an external charging operation.

If Ready-ON has been triggered by an external charging operation, the control section 70 inhibits the constant duty control of the cooling fan 40 and the process proceeds to step S107 in FIG. 5 where the cooling fan 40 is controlled based on the variable duty control. In this case, as indicated by dashed and double-dotted line g2 in FIG. 8A, at time t0, the rotation speed R of the cooling fan 40 becomes the minimum rotation speed R0, thereafter increases with time, and after time t3, varies with time. Also, as indicated by dashed and double-dotted line i2 in FIG. 8B, after time t0, the temperature TB of the main battery 10 gradually lowers and reaches the normal operation temperature TS after a while.

If the Ready-ON state has been caused by operating the ignition switch 27 ON, rather than by an external charging operation, the process proceeds to step S105 in FIG. 5, where the control section 70 performs the constant duty control of the cooling fan 40, and the process further proceeds to step S106 in FIG. 5. In the example shown in 8A and 8B, as the temperature TB of the main battery 10 at the time of Ready-ON exceeds the third predetermined temperature T2 and is lower than the second predetermined temperature T1, the control section 70 performs the constant duty control with the command duty being set to the maximum value D3, and performs the detection process of abnormal condition of the cooling fan 40. At this time, the rotation speed R of the cooling fan 40 is R2 which is the highest rotation speed, as indicated by solid line g1 in FIG. 8A. As the maximum value D3 of the command duty D is higher than the command value for the variable duty control corresponding to the temperature TB of the main battery 10, the rotation speed of the cooling fan 40 in the case of the command duty D3 as indicated by solid line g1 in FIG. 8A is higher than the rotation speed of the cooling fan 40 in the case of the variable duty control indicated by dashed and double-dotted line g2 in FIG. 8A. As driving of the cooling fan 40 at the maximum rotation speed R2 also increases the airflow rate, the temperature TB of the main battery 10 lowers from temperature Tc, as indicated by solid line i1 in FIG. 8B.

If the constant duty control of the cooling fan 40 and the detection process of abnormal condition are completed at time t3 when the predetermined time Δt has elapsed, similar to the example case described above, the process proceeds to step S107 in FIG. 5 where the control section 70 changes the control of the cooling fan 40 to the variable duty control based on the duty map shown in FIG. 4 and then terminates the operation of the program. After time t3, as indicated by solid line g1 in FIG. 8A, the rotation speed R of the cooling fan 40 varies significantly in accordance with the temperature of the main battery 10 and other parameters, and, after time t3, the temperature TB of the main battery 10 is controlled in the vicinity of the normal operation temperature TS as indicated by solid line i1 in FIG. 8B.

When Main Battery Temperature TB is Equal to or Higher than Second Predetermined Temperature T1

If the temperature TB of the main battery 10 in the Ready-ON state of the electric drive vehicle is equal to or higher than the second predetermined temperature T1, the control section 70 determines NO in steps S101 and S108 in FIG. 5, and the process proceeds to step S109 in FIG. 5. In accordance with the determination result YES or NO in step S109, the process proceeds to step S110 or step S111 where the cooling fan 40 is controlled under the variable duty control. The process then returns to step S101 in FIG. 5 where the control section 70 monitors the temperature TB of the main battery 10. If the temperature TB of the main battery 10 becomes lower than the fourth predetermine temperature T3, the variable duty control with the use of the high duty map is changed to the variable duty control with the use of the normal duty map. Further, if the temperature of the main battery 10 becomes lower than the second predetermined temperature T1, the control section 70 determines YES in step S108 in FIG. 5 and the process jumps to step S104 in FIG. 5 where the control section 70 determines whether or not the Ready-ON has been caused by an external charging operation. If the Ready-ON triggered by the external charging operation is determined, the control section 70 inhibits the constant duty control of the cooling fan 40, and if the Ready-ON triggered by an operation other than the external charging operation is determined, as described above with reference to FIG. 8A, the constant duty control of the cooling fan 40 is performed with the command duty being maintained at the maximum value D3 as shown in step S105, and the process proceeds to step S106 where the control section 70 performs the detection process of abnormal condition of the cooling fan 40. As in the example described above with reference to FIG. 8A, when the predetermined period Δt has elapsed and the constant duty control of the cooling fan 40 and the detection process of abnormal condition are completed, the process proceeds to step S107 in FIG. 5 where the control section 70 changes the control of the cooling fan 40 to the variable duty control based on the duty map shown in FIG. 4 and then terminates the operation of the program.

While in the example described above, the control section 70 calculates and outputs the command duty D, the control unit 45 of the cooling fan 40 may be configured to calculate the command duty D and control the motor 44. Specifically, the control section 70 may be configured to output information which is necessary for driving control of the cooling fan 40 including the temperature TB of the main battery 10 to the control unit 45, which then calculates the duty for driving the cooling fan 40 based on the received information. Further, while in the above example the cooling fan 40 is driven by the motor 44, the cooling fan 40 may be driven by an alternating current motor. In this case, the control unit 45 may be configured to generate an alternating current driving waveform in accordance with the duty to control the rotation speed of the alternating current motor.

While in the example described above, the duty map illustrated in FIG. 4 is used to determine the command duty D, and, when the temperature of the main battery 10 is equal to or higher than the fourth predetermined temperature T3, the variable duty control is performed based on the region B in FIG. 4, two or more types of duty map are prestored in the memory 72 and used in a switching manner in accordance with the temperature of the main battery 10. For example, there may be prestored in the memory 72 a high duty map in which the command duty D is set to comparatively high values with respect to the detected parameters including the temperature TB of the main battery 10, the intake air temperature of the cooling fan 40, the temperature within the vehicle interior, the vehicle speed Vel, the driving state of the air conditioner, the current of the main battery 10, the driving state of the engine, and other parameters, and a low duty map in which the command duty D is set to low values, so that the duty map to be used is changed based on the temperature TB of the main battery 10 and the driving status of the electric drive vehicle 90. In this case, if the temperature TB of the main battery 10 is equal to or higher than the fourth predetermined temperature T3 and quick cooling of the main battery 10 is desired, or if the noise of the cooling fan 40 is not a matter of concern, the command duty D may be determined based on the high duty map, whereas if a low rate of cooling the main battery 10 does not cause any problems such as when the temperature TB of the main battery 10 is lower than the fourth predetermined temperature T3, or if the noise of the cooling fan 40 is a matter of concern, the command duty may be determined based on the low duty map.

While preferred embodiments of the present invention have been described using specific terms, such description is for illustrative purposes only, and it is to be understood that changes and variations may be made without departing from the spirit or scope of the appended claims.

The invention claimed is:

1. A cooling system for cooling a secondary battery mounted in an electric drive vehicle for driving the vehicle, the cooling system comprising:
   a cooling fan configured to blow cooled air to the secondary battery;
   a temperature sensor configured to detect a temperature of the secondary battery; and
   a controller configured to:
      adjust a rotation speed of the cooling fan; and
      detect presence or absence of an abnormal condition of the cooling fan,
   wherein start up of the electric drive vehicle is caused by operating an ignition switch ON or by connecting a connector of an external power source to a charging connector disposed on the electric drive vehicle,
   wherein the controller is configured to determine whether the start up of the electric drive vehicle is caused by operating the ignition switch ON or by connecting the connector of the external power source to the charging connector disposed on the electric drive vehicle, and the controller is configured to:
   when the start up of the electric drive vehicle is caused by operating the ignition switch ON,
      cause the cooling fan to be driven with a constant command value to enable detection of an abnormal condition of the cooling fan for a predetermined time period when the temperature of the secondary battery is equal to or higher than a first predetermined temperature after the start up of the electric drive vehicle is caused by operating the ignition switch ON, and
      perform a detection process of an abnormal condition for detecting presence or absence of the abnormal condition of the cooling fan based on an actual rotation speed of the cooling fan, and
   when the start up of the electric drive vehicle is caused, not by operating the ignition switch ON, but by connecting the connector of the external power source to the charging connector disposed on the electric drive vehicle,
      drive the cooling fan with a command value that is variable in accordance with the temperature of the secondary battery while inhibiting the driving of the cooling fan with the constant command value and not performing the detection process based on the actual rotation speed of the cooling fan.

2. The cooling system for on-vehicle secondary battery according to claim 1, wherein,
   when the temperature of the secondary battery is equal to or higher than a second predetermined temperature which is higher than the first predetermined temperature, the driving of the cooling fan with the constant command value is inhibited.

3. The cooling system for on-vehicle secondary battery according to claim 1, wherein,
   the constant command value is set to a value which is lower than a command value corresponding to the temperature of the secondary battery detected when control is performed in which the command value is variable in accordance with the temperature of the secondary battery.

4. The cooling system for on-vehicle secondary battery according to claim 2, wherein
   when the temperature of the secondary battery is higher than a third predetermined temperature which is equal to or higher than the first predetermined temperature and lower than the second predetermined temperature, the constant command value is set to a value which is higher than a command value corresponding to the temperature of the secondary battery detected when control is performed in which the command value is variable in accordance with the temperature of the secondary battery.

* * * * *